United States Patent
Xue et al.

(10) Patent No.: US 12,088,654 B1
(45) Date of Patent: Sep. 10, 2024

(54) NETWORK LATENCY IMPACT REDUCTION

(71) Applicant: International Business Machines Corporation, Armonk, NY (US)

(72) Inventors: Xiang Yu Xue, Beijing (CN); Hui Wang, Beijing (CN); Yu Mei Dai, Beijing (CN); Mai Zeng, Beijing (CN); Xiao Chen Huang, Beijing (CN); Wei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/207,886

(22) Filed: Jun. 9, 2023

(51) Int. Cl.
*H04L 65/80* (2022.01)
*H04L 65/403* (2022.01)
*H04L 12/18* (2006.01)
*H04L 43/08* (2022.01)

(52) U.S. Cl.
CPC ............ *H04L 65/80* (2013.01); *H04L 65/403* (2013.01); *H04L 12/1822* (2013.01); *H04L 12/1827* (2013.01); *H04L 43/08* (2013.01)

(58) Field of Classification Search
CPC ..... H04L 65/80; H04L 65/403; H04L 67/142; H04L 12/1827; H04L 12/1822; H04L 43/08
See application file for complete search history.

(56) References Cited

U.S. PATENT DOCUMENTS

| | | | |
|---|---|---|---|
| 7,035,230 B1* | 4/2006 | Shaffer | H04L 47/15 370/261 |
| 7,984,174 B2 | 7/2011 | Rideout | |
| 9,185,347 B2 | 11/2015 | Kariti et al. | |
| 9,521,057 B2 | 12/2016 | Klingbeil et al. | |
| 11,381,410 B1* | 7/2022 | Yemul | H04L 12/1827 |
| 2008/0063173 A1* | 3/2008 | Sarkar | H04M 3/56 379/202.01 |

(Continued)

FOREIGN PATENT DOCUMENTS

WO 2022228689 A1 11/2022

OTHER PUBLICATIONS

Lumezanu, C., et al., "Triangle Inequality and Routing Policy Violations in the Internet", DBLP, Apr. 2009, 10 pages.

(Continued)

*Primary Examiner* — Jungwon Chang
(74) *Attorney, Agent, or Firm* — Scully, Scott, Murphy & Presser, P.C.; Michael P. O'Keefe, Esq.

(57) ABSTRACT

A system and/or method that can reduce impact of network latency can be provided. Information associated with a user device participating in an online meeting can be determined, for user devices connecting to the online meeting. Based on the information, the user devices can be grouped. For each of the user devices in a group, network quality associated with network connection between a user device in the group and a server managing the online meeting can be evaluated. Based on the network quality, at least one user device in the group can be designated to operate as a sharer device to at least one other user device in the group. The sharer device can be caused to stream data directly from the server during the online meeting. That one other user device can be caused to connect with and stream data from the sharer device.

20 Claims, 5 Drawing Sheets

(56) References Cited

U.S. PATENT DOCUMENTS

| | | |
|---|---|---|
| 2010/0325209 A1 | 12/2010 | Thapa |
| 2016/0165007 A1* | 6/2016 | Assem Aly Salama ..................... H04L 67/142 709/224 |
| 2016/0165009 A1* | 6/2016 | Assem Aly Salama ..................... H04L 47/24 709/224 |
| 2017/0171258 A1* | 6/2017 | Assemaly Salama .. H04L 65/80 |
| 2020/0058408 A1 | 2/2020 | Jain et al. |
| 2021/0186418 A1 | 6/2021 | Esmailian et al. |
| 2023/0128334 A1 | 4/2023 | Hatfield et al. |
| 2023/0247177 A1* | 8/2023 | Roper .................... H04N 7/148 709/204 |
| 2023/0300295 A1* | 9/2023 | Tangeland .......... H04L 12/1822 709/204 |

OTHER PUBLICATIONS

Luo, C., et al., "A Multiparty Videoconferencing System Over an Application-Level Multicast Protocol", IEEE Transactions on Multimedia, Dec. 2009, pp. 1621-1632, vol. 9, No. 8.

* cited by examiner

NETWORK LATENCY IMPACT REDUCTION

BACKGROUND

The present application relates generally to computers and computer applications, and more particularly to reducing communication network latency and online meeting devices.

Online meetings are remote collaboration tools that leverage communication networks such as the Internet, used widely, for example, in modern business activities on a global scale. Online meetings, which can also be referred to as online conferencing, can help people communicate, collaborate, and make decisions in real time from different locations, increasing efficiency and reducing costs that could be incurred related to gathering people together in one physical place for an in-person meeting. However, network latency can cause a range of issues with online meetings, including but not limited to poor video and audio quality, screen sharing issues, and connection issues. Poor video and audio quality may be affected when network latency is too high, where video and audio signals can become blurry or interrupted, making it difficult for participants to hear or see other participants' voices or screens clearly. Screen sharing issues may occur during peak network latency, where some participants may not receive screen sharing properly, and thus affect the effectiveness of online meetings. Connection issues may become prominent as network latency can prevent participants from joining an online meeting properly, and thus can delay the meeting process. For those and other reasons, it can be desirable to reduce the impact of network latency, for example, of an online meeting.

BRIEF SUMMARY

The summary of the disclosure is given to aid understanding of a computer system and method of network latency reduction, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include determining information associated with a user device participating in an online meeting, for user devices connecting to the online meeting, the information including at least an Internet Protocol (IP) address of the user device. The method can also include grouping the user devices based on the information. The method can further include, for each of the user devices in a group, evaluating network quality associated with network connection between a user device in the group and a server managing the online meeting. The method can also include, based on the network quality, designating at least one user device in the group to operate as a sharer device to at least one other user device in the group. The method can also include causing the sharer device to stream data directly from the server during the online meeting. The method can further include causing said at least one other user device to connect with and stream data from the sharer device during the online meeting.

A system that includes at least one processor and at least one memory device can be provided, where at least one processor can be configured to perform one or more aspects of the methods described herein.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
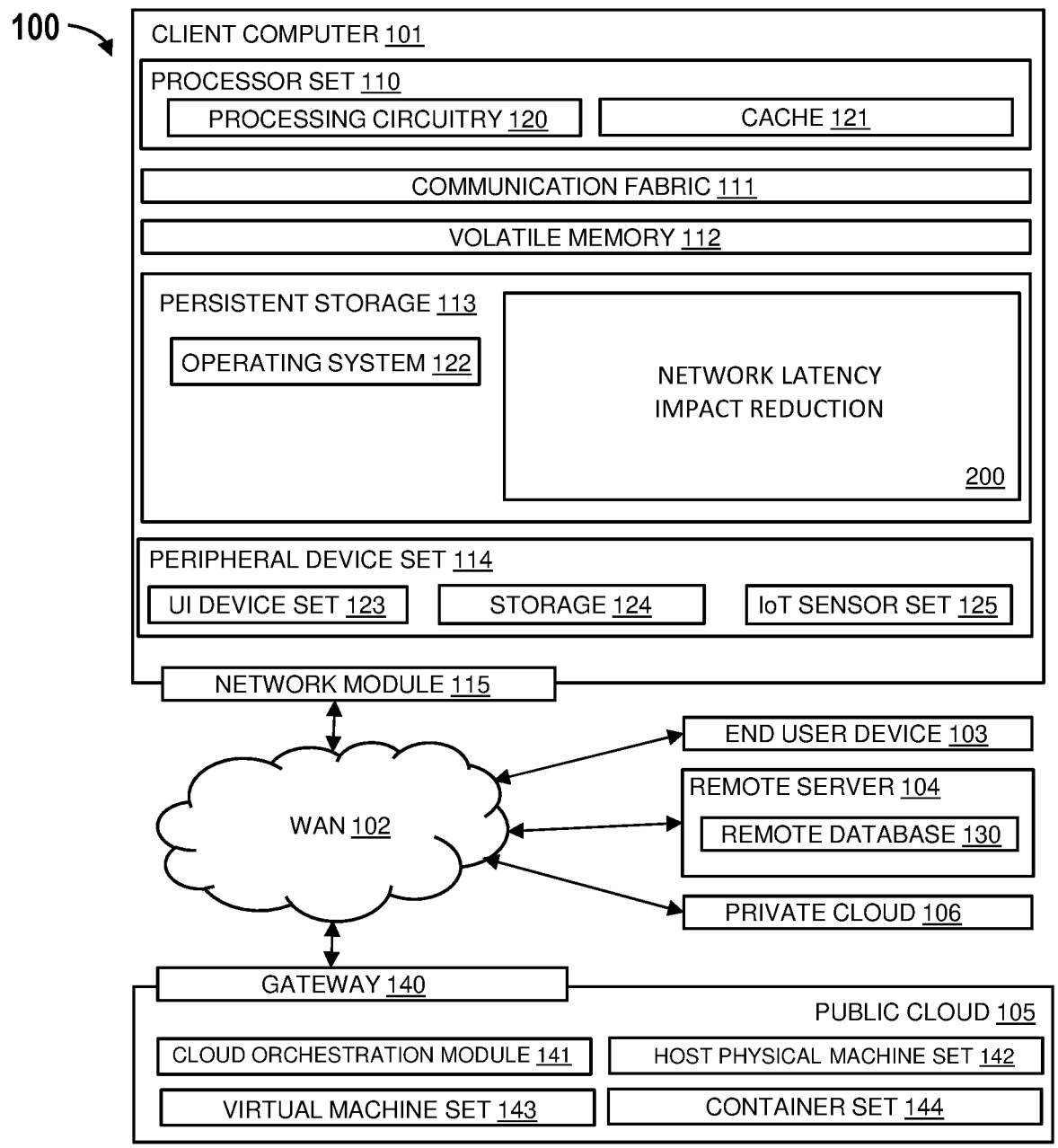
FIG. 1 shows an example of a computing environment, which can implement network latency reduction in an embodiment.

A computer-implemented method, in an aspect, can include determining information associated with a user device participating in an online meeting, for user devices connecting to the online meeting, the information including at least an Internet Protocol (IP) address of the user device. The method can also include grouping the user devices based on the information. The method can further include, for each of the user devices in a group, evaluating network quality associated with network connection between a user device in the group and a server managing the online meeting. The method can also include, based on the network quality, designating at least one user device in the group to operate as a sharer device to at least one other user device in the group. The method can also include causing the sharer device to stream data directly from the server during the online meeting. The method can further include causing said at least one other user device to connect with and stream data from the sharer device during the online meeting.

The method can reduce the network latency impact of user devices participating in an online meeting. For example, the network latency impact can be reduced in user devices that have weak network connections during an online meeting.

One or more of the following aspects or features can be separable or optional from each other in one or more embodiments.

In another aspect, the information can also include a geographic location where a user device is located. Grouping by locations (e.g., within threshold perimeters of one another) can ensure that there are not long distances that data need to travel between devices, thus keeping the network latency low between user devices.

Yet in another aspect, the designating of the at least one user device in the group to operate as a sharer device, can include, selecting n percentage of user devices in the group that have top network quality, that agree to share streams, where n is configurable. Having several sharer devices can help in distributing streaming sharing load among the sharer devices, and option of selecting among different sharer devices.

Yet in another aspect, the method can further include repeatedly performing for each of the user devices in a group, the evaluating of the network quality associated with network connection between a user device in the group and a server managing the online meeting, and based on the evaluating adjusting direct and indirect streaming modes of the user devices in the group. Such dynamic adjustments can keep the network latency impact low or to a minimum, while the online meeting is taking place, and even as the network quality changes over time, for example, due to different loads or status of network connection.

Yet in another aspect, the method can include, for the at least one other user device that streams data from the sharer device, responsive to determining that the network quality between the at least one other user device that streams data from the sharer device and the server is above a first threshold, causing the at least one other user device that streams data from the sharer device to stream directly from the server.

In this way, for example, a user device can switch to streaming from the server directly, responsive to the network quality between the user device and the server becoming better.

In yet another aspect, the method can include, for the at least one other user device that streams data from the sharer device, repeatedly evaluating sharer network quality associated with network connection between the at least one other user device and the sharer device, and responsive to determining that the sharer network quality is below a second threshold, and that the network quality between the at least one other user device and the server is below the second threshold, selecting another sharer device in the group and causing the at least one other user device to connect with and stream data from said another sharer device in the group.

In this way, for example, responsive to the network quality between a sharer device and a user device that streams from that sharer device becoming weak, the user device can switch to stream from another sharer device, so that the user device's streaming quality is maintained.

In yet another aspect, the method can include, for the sharer device, responsive to determining that the network quality between the sharer device and the server is below a second threshold, releasing network connection between the sharer device and the at least one other user device that streams data from the sharer device, and causing the at least one other user device to connect with and stream data from another sharer device in the group.

In this way, for example, if during the online meeting, the sharer device's connection to the server becomes weak, a user device that connects indirectly via the sharer device can switch to another share device in the group, such that that user device's network latency impact is kept low, even when its sharer device's connection becomes weak.

Still yet in another aspect, the method can include, responsive to determining that the network quality between the sharer device and the server is below a second threshold, adding a new sharer device to the group based on selecting a user device in the group having next top network quality.

In this way, for example, the number of top sharer devices in the group can be maintained, in the event another sharer device should be selected, e.g., because of change in network quality associated with existing one or more sharer devices.

Yet in another aspect, the method can include, based on the evaluating, generating a network score for each of the user devices in the group, and where the designating at least one user device in the group to operate as a sharer device includes, based on the network score for each of the user devices, designating at least one user device in the group to operate as a sharer device to at least one other user device in the group.

In this way, for example, the network quality can be enumerated using a score, making it easier for a computer process to manipulate and operate with, for example, to normalize and manage the network quality.

In yet another aspect, the evaluating of the network quality can include performing at least one of: a speed test that measures download and upload speed of network connection; a ping test measures response time of network connection; a jitter test that measures variation in network packet delays; a packet loss test that measures relative amount of packets lost during transmission; and Mean Opinion Score (MOS) test that measures audio and video streaming qualities.

In this way, for example, different connection properties can be weighed in, when determining the network quality.

In still yet another aspect, the evaluating of the network quality can include performing tests including at least a speed test that measures download and upload speed of network connection, a ping test measures response time of network connection, a jitter test that measures variation in network packet delays, a packet loss test that measures relative amount of packets lost during transmission, and Mean Opinion Score (MOS) test that measures audio and video streaming qualities, where the network quality is measured as a normalized weighted sum of measurements obtained from the tests.

In this way, for example, different weights can be attributed to different connection properties, when determining the network quality.

A system that includes at least one processor and at least one memory device can be provided, where at least one processor can be configured to perform one or more aspects of the methods described herein.

A computer program product that includes a computer readable storage medium having program instructions embodied therewith, the program instructions readable by a device to cause the device to perform at least one or more aspect of the methods described above can be provided.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as network latency reduction algorithm/code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In one or more embodiments, systems, methods, and/or techniques can be provided that can reduce the impact of network latency, e.g., in online meetings. The method can improve meeting communication efficiency, shorten meeting times, and increase productivity, the audio-visual experience for participants, and enhance trust among participants in online meetings. In an embodiment, network latency improvement can target to improve network connection of one or more user devices that have weaker communication network connection quality, e.g., among online meeting participants.

Figure 2:
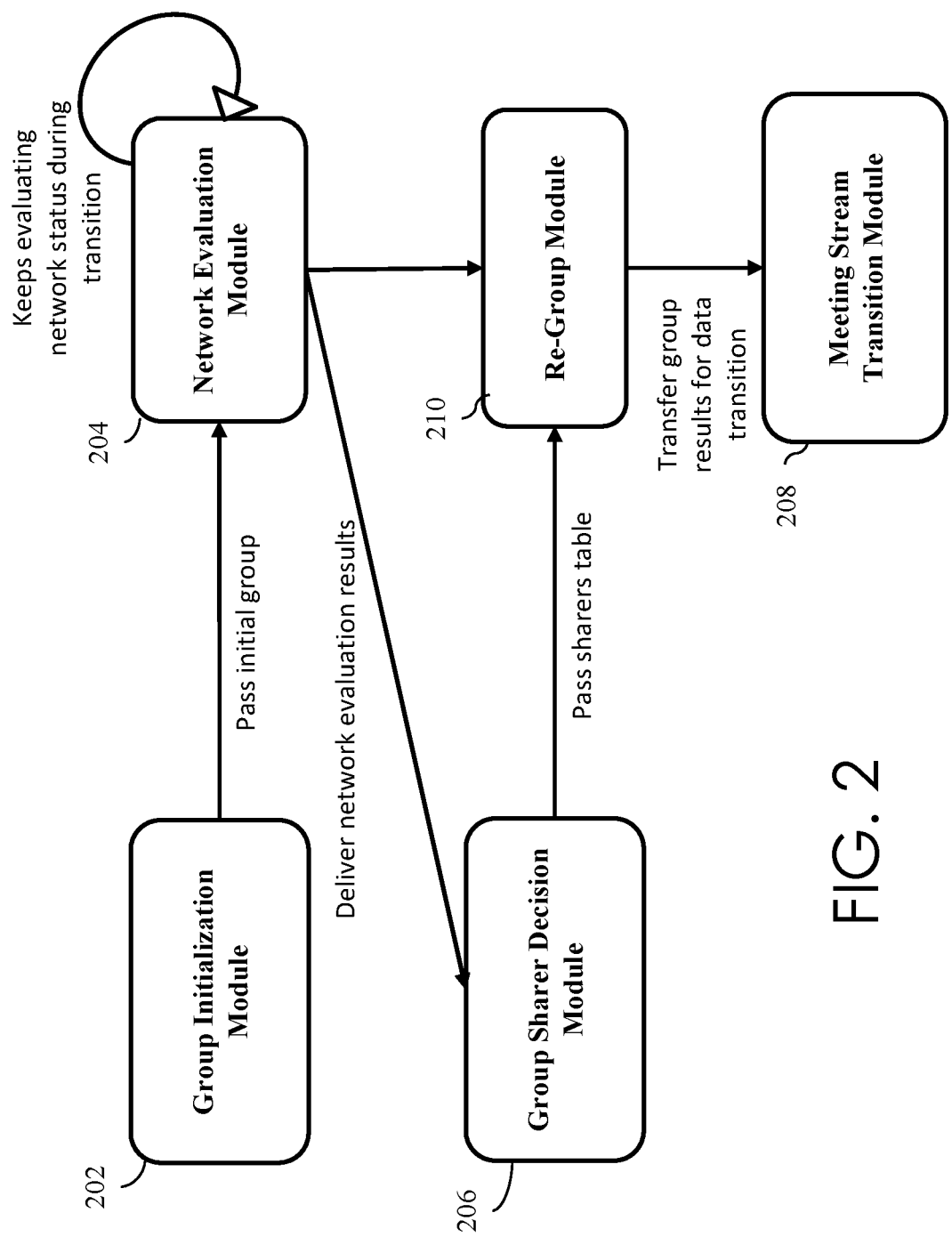
FIG. 2 is a diagram illustrating modular components of a system or tool that can implement network latency reduction in an embodiment.

FIG. 2 is a diagram illustrating modular components of a system or tool that can implement network latency reduction in an embodiment. In an embodiment, a system can include the following modules. A module can be one or more of, or a combination of, computer software runnable on a computer processor or hardware, a computer firmware, or hardware programmed to run instructions that perform acts or operation that a module is programmed to do. For example, such modules can be run on one or more computers or computer processors, for instance, one or more processors can run or perform one or more acts or operations described herein with reference to those modules. A server is a device from which a user device streams data during an online meeting. A server can be a central connectivity that provisions an online meeting, via which the participants connect and communicate. A server can be hardware, software, or a combination of hardware and software. A server can serve as a control center for an online meeting, gathering information for user devices participating in an online meeting, and managing network connections of the user devices. In an embodiment, a user device that participates in an online meeting may stream data from the server directly or indirectly through connection via another device. A sharer or sharer device is a device via which a user device may stream data from the server indirectly. A sharer can be a user device. Examples of user devices can include, but are not limited to, computers such as desktops, laptops, tablets, mobile devices such as smartphones, and/or other devices, on which an online meeting can be run. In online meetings, data streams such as text-based messages, voice and/or video can be shared, for example, in real-time, across geographically dispersed locations. In an embodiment, the server (e.g., a computer acting as the server, and/or a software acting as a server on a computer) can be located with a vendor that is providing the online meeting tool. In another embodiment, the server can be located or installed locally with one or more user company's location.

In an embodiment, information requested and gathered can be based on an opt-in and opt-out basis. For instance, users of the user devices can provide permission for the information. Similarly, participating possibly as a sharer device can be done on an opt-in and opt-out basis, where users or user devices are able to grant or deny permission.

Group initialization module 202 can decide what group a participant should be grouped into when the participant joins the online meeting. For example, the group initialization module can group participants according to the Internet Protocol (IP) and location of the participants' devices. Group initialization module 202 initializes and groups users who have joined the online meeting. For instance, group initialization module 202 can divide all participants into a plurality of groups based on one or more criteria such as by IP addresses and locations at the start of the meeting. For instance, user devices having similar IP addresses and/or located in geographically nearby areas can be grouped together. In an embodiment, similarity of IP address can be determined based on whether some of the components of the IP address are the same. For example, those that share a threshold number of components (or parts) of the IP address can be grouped together. For instance, consider an IP address having network ID part and host ID part. By way of example, those with the same network ID part of the IP address can be grouped together. As another example, those that share the same n number of parts or components can be grouped together, where n can be configurable or given. Participants or user devices can also be grouped according to their physical location. For instance, those that are within d distance or perimeter can be grouped together, where d can be configurable, or given. For one or more users that joined after the meeting has started, group initialization module 202 can group those users into the group having the closest location. Table 1 shows an example of initial grouping. User01 and user 02 in Table 1 example below have similar IP addresses or locations (e.g., they can be under the same subnet, or nearby or close in locations), and can be grouped together. User03 and user04 share the same first 2 parts of the IP address, and can be grouped together (where in this example, n is 2).

TABLE 1

| User ID | Location | IP Address | Network Score | Initial Group |
|---------|----------|------------|---------------|---------------|
| user01 | Loc 1 | 9.3.3.4 | 5 | Group01 |
| user02 | Loc 1. | 9.3.6.4 | 4.5 | Group01 |
| user03 | Loc 2. | 10.23.xxx.xxx | 2 | Group02 |
| user04 | Loc 2. | 10.23.xxx.xxx | 3 | Group02 |
| user05 | Loc 3. | 92.xxx.xxx.xxx | 5 | Group03 |
| ... | | | | |

Network evaluation module 204 can evaluate, during the meeting, the real-time connection status between devices, and can determine whether the current connection quality would affect the receiving of the meeting stream. For example, network evaluation module 204 calculates network quality between users and a server, and also between users and one or more sharers. To evaluate network quality, network evaluation module 204 may perform one or more tests to measure one or more of the network connection properties such as, but not limited to, download and upload speed of network connection, response time of network connection, variation in the delay of network packets, percentage or relative amount of packets lost during transmission, and/or quality of audio and video streaming. Any one or combinations of such measurements can be used to evaluate the network quality. In an embodiment where more than one measurement is used, a weighted average score can be calculated, that takes into account those variety of measurement.

For example, in an embodiment, network evaluation module 204 can perform the following: Conduct a speed test to measure the download and upload speed of the network connection. Score the speed test measurement, for example, normalizing the score. For instance, the measurement can be scored on a scale of 1 to 5, with 1 being poor and 5 being excellent; Conduct a ping test to measure the response time of the network connection. Score the ping test measurement, normalizing the score. For instance, the measurement can be scored on a scale of 1 to 5, with 1 being poor and 5 being excellent; Conduct a jitter test to measure the variation in the delay of the network packets. Score the jitter test measurement, normalizing the score. For instance, the measurement can be scored on a scale of 1 to 5, with 1 being poor and 5 being excellent; Conduct a packet loss test to measure the percentage of packets lost during transmission. Score the packet loss test measurement, normalizing the score. For instance, the measurement can be scored on a scale of 1 to 5, with 1 being poor and 5 being excellent; Conduct a Mean Opinion Score (MOS) test to measure the quality of audio and video streaming. Score the MOS test, normalizing the score. For instance, the measurement can be scored on a scale of 1 to 5, with 1 being poor and 5 being excellent; Calculate the weighted average score of all the tests result as the score between the two devices. For instance, each test can be given or assigned a weight. Table 2 shows an example of user01's network score with a server. Network score is also referred to as network quality score.

TABLE 2

| Test Item | Network score in every item | Weight | Network score |
| --- | --- | --- | --- |
| Speed test | 4 | 2 | (4*2 + 5*3 + 4*1 + |
| Ping test | 5 | 3 | 4*3 + 4*1)/10 = 4.3 |
| Jitter test | 4 | 1 | |
| Packet loss test | 4 | 3 | |
| MOS test | 4 | 1 | |

Group sharer decision module 206 can select which one or more user devices in a group can be the sharers of this group. Group sharer decision module 206 determines which users in each group can be sharers. In an embodiment, group sharer decision module 206 can perform the following operations: For each group, score the network connection between the member and the server using the network evaluation module 204; Sort the network score in descending order, mark the top percentage (for example, 10%) users who agree to share streams as sharers. For instance, user devices that have threshold network quality score can be asked to act or operate as a sharer (e.g., sharer device), and out of those that agree to do so, a number of user devices (e.g., top y percentage) can be selected to have the role of "sharer". Table 3 shows an example sharer group, e.g., Group01.

TABLE 3

| User ID | Network score with server | Stream Source | Way to connect to server | Role |
| --- | --- | --- | --- | --- |
| user01 | 5 | server | direct | sharer |
| user02 | 5 | server | direct | sharer |
| user03 | 3 | server | direct | none |
| user04 | 2 | sharer:user01 | indirect | member |
| ... | | | | |

In Table 3, "Stream source" can be a server or sharer. For instance, data streams can be received from a server or from a sharer. "Way to connect to server" can include a direct connection or an indirect connection, via another device. A role assigned to a user can be "sharer", "member", and "none". A sharer receives data stream directly from the server. A member receives data stream from a sharer. When no role is assigned, e.g., "none", or role of "none" is assigned, data stream can be received from the server directly and there is no need to share the stream with other participants. Default role can be "none", where based on the network evaluation, group sharer decision module 206 can select or assign "sharer" and "member" role to user devices.

Meeting stream transition module 208 can stream a meeting according to different groups and different sharers a participant connects with. This module transfers data based on the defined groups and roles. For example, meeting stream transition module 208 can send information or notification to the user devices participating in an online meeting, as to, from where each user device is to stream meeting data (e.g., a server directly or via a sharer device). Based on the information or instructions, the group member requests data stream from the assigned sharer. Other users, including the sharer request data streams from the server.

Figure 3:
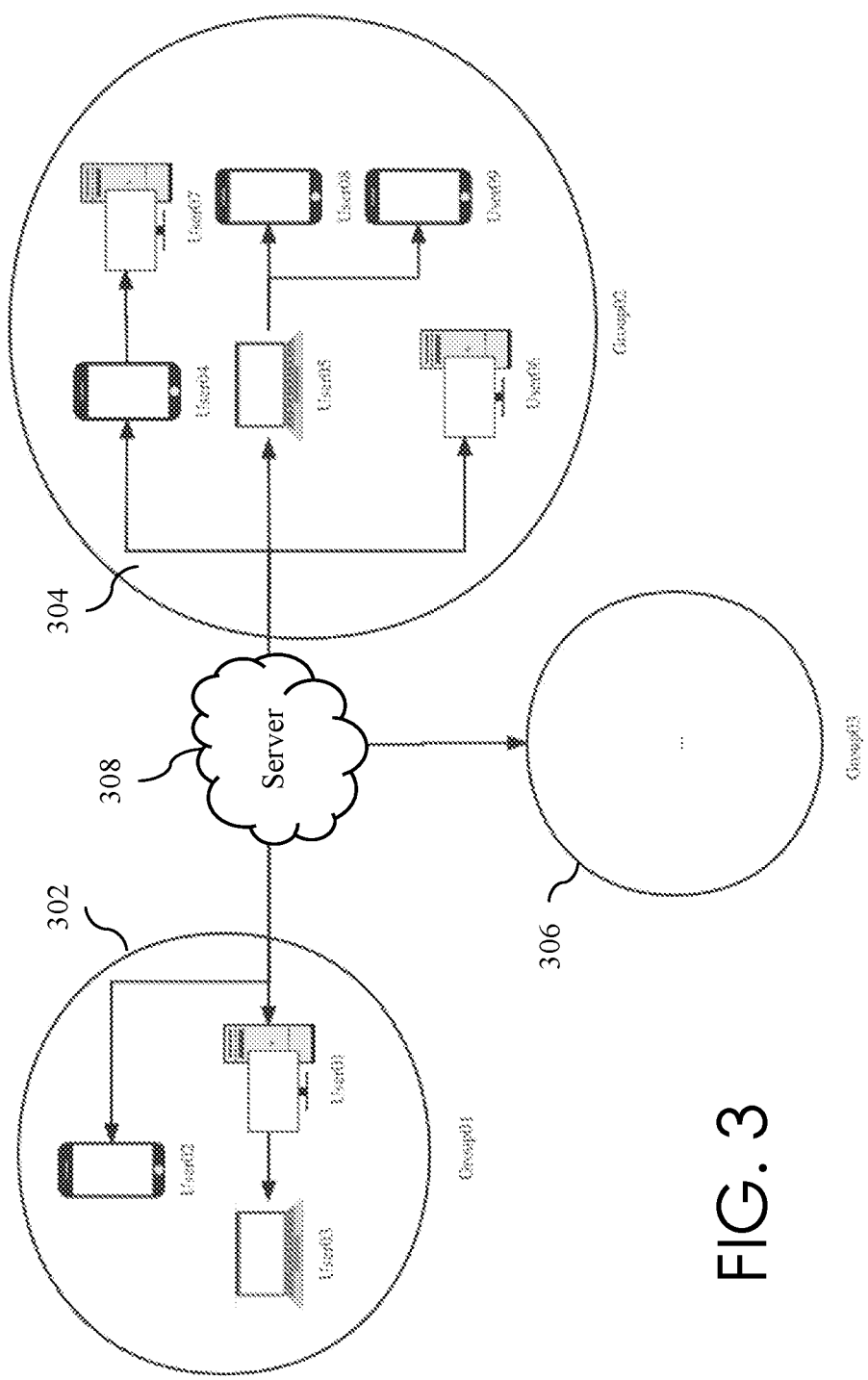
FIG. 3 shows an example topology of groups and streaming methods in an embodiment.

FIG. 3 shows an example topology of groups and streaming methods in an embodiment. In this example, a processor has divided the participants into Group01 302, Group02 304 and Group03 306, for example, by implementing the functions or operations of group initialization module (FIG. 2, 202). Consider that Group01 includes User01, User02, and User03; Group02 includes User04, User05, User06, User07, User08, User09; Group03 includes other users. In Group01, User01 is assigned a sharer role, while User03 is assigned a member role that streams from User01. User02 in Group01 is not assigned a role, for example, "none", and streams from a server 308 directly. In Group02, User04 is assigned a sharer role and User07 is assigned a member role. User07 streams from User04. User05 is assigned a sharer role and User08 and User09 are assigned member roles. User08 and User09 streams from User05, while User05 streams from the server 308 directly. User06 is not assigned as role, e.g., "none". In Group03, no users are assigned a role, and thus Group03's users stream directly from the server 308. The topology shows multiple users (user devices) streaming data from a server, where some user devices stream directly from the server (e.g., server+sharer, server+none), while others stream indirectly via another user device (e.g., server+sharer 4 member). In an embodiment, systems and/or methods can transform client-server architecture to member-sharer-server architecture.

Referring to FIG. 2, in an embodiment, re-group module 210 can dynamically adjust the group to which the participant belongs according to the results of the evaluation module. For instance, during the meeting, re-group module 210 and continuously adjust groups and/or user roles based on the results of the network evaluation, for example, performed by network evaluation module 204 and group decision sharer module 206. Re-group module 210 can receive information such as a sharer table that lists the roles of the user devices, e.g., including selected sharers or sharer devices in an embodiment. For example, for sharers or sharer devices, the network score between them and the server is continuously calculated. When the score turns to low, the user's role can be changed to none and respective member who are downloading stream from that user can switch to download from another sharer in same group. Re-group module 210, at same time, can select another sharer to add to a list of sharers.

Table 4 shows an example of adjustments made in a group, for example, Group01 shown in FIG. 3. The network score associated with user01 has decreased to 3, hence, user02 is selected as a sharer (user01's role is adjusted to "none", user02's role is adjusted to "sharer"). User04 streams from user02 instead of user01.

TABLE 4

| User ID | Network score with server | Stream Source | Way to connect to server | Role |
|---|---|---|---|---|
| user01 | 5 –> 3 | server | direct | sharer –> none |
| user02 | 5 | server | direct | sharer |
| user03 | 4 | server | direct | none |
| user04 | 2 | sharer:user01 –> sharer:user02 | indirect | member |
| . . . | | | | |

For a group member who downloads or receives data stream from a sharer, the network score to the sharer and server can be continuously calculated. In an embodiment, adjustment can be done as follows: When the connection to the server turns from weak to normal (stronger, or above a threshold), change the role to none, and download stream from the server directly. When the connection to the sharer turns weaker (or below the threshold), select one of the available sharer in the group who has the best network score and connect to that user.

Table 5 shows an example of an adjustment made in an example scenario in which the connection to the server turns stronger. User04's network score with the server has increased to 5, and hence, user04's stream source is adjusted to "server", user04's way to connect to server becomes "direct", user04's role is adjusted to "none". That is, an adjustment is made to the way user04 streams data, i.e., directly from the server, rather than indirectly via user01.

TABLE 5

| User ID | Network score with server | Network score with sharer | Stream Source | Way to connect to server | Role |
|---|---|---|---|---|---|
| user01 | 5 | | server | direct | sharer |
| user02 | 5 | | server | direct | sharer |
| user03 | 4 | | server | direct | none |
| user04 | 2 –> 5 | 5 | sharer:user01 –> server | indirect –> direct | member –> none |
| . . . | | | | | |

Table 6 shows an example of an adjustment made in an example scenario in which the connection to the sharer turns weaker. User04's network score with sharer (sharer's device) becomes weaker, hence, user04's stream source is adjusted to a stronger sharer in the group, in this example, user02.

TABLE 6

| User ID | Network score with server | Network score with sharer | Stream Source | Way to connect to server | Role |
|---|---|---|---|---|---|
| user01 | 5 | | server | direct | sharer |
| user02 | 5 | | server | direct | sharer |
| user03 | 4 | | server | direct | none |
| user04 | 2 | 5 –> 1 | sharer:user01 –> sharer:user02 | indirect | member |
| . . . | | | | | |

For other users, connection to the server can be maintained. If the connection to the server turns weak or becomes below a threshold, the user can be selected to a sharer's list (e.g., to indirectly stream). Table 7 shows an example where the connection to the server turns weaker. For example, user03 device's network score with server becomes low, hence user03's stream source is adjusted to "user02", and the way to connect to the server is adjusted to "indirect", and the role is adjusted to "member" from "none". That is, user03 streaming is adjusted to stream data indirectly via a user02's device, instead of directly from the server as was done prior to the server connection turning weak.

TABLE 7

| User ID | Network score with server | Network score with sharer | Stream Source | Way to connect to server | Role |
|---|---|---|---|---|---|
| user01 | 5 | | server | direct | sharer |
| user02 | 5 | | server | direct | sharer |
| user03 | 4 –> 1 | 0 –> 5 | server –> sharer:user02 | direct –> indirect | None –> member |
| user04 | 2 | 5 | sharer:user01 | indirect | member |
| . . . | | | | | |

In an embodiment, systems and methods disclosed herein can connect a user's device with poor network connection to the peer side to improve the online meeting experience.

Figure 4:
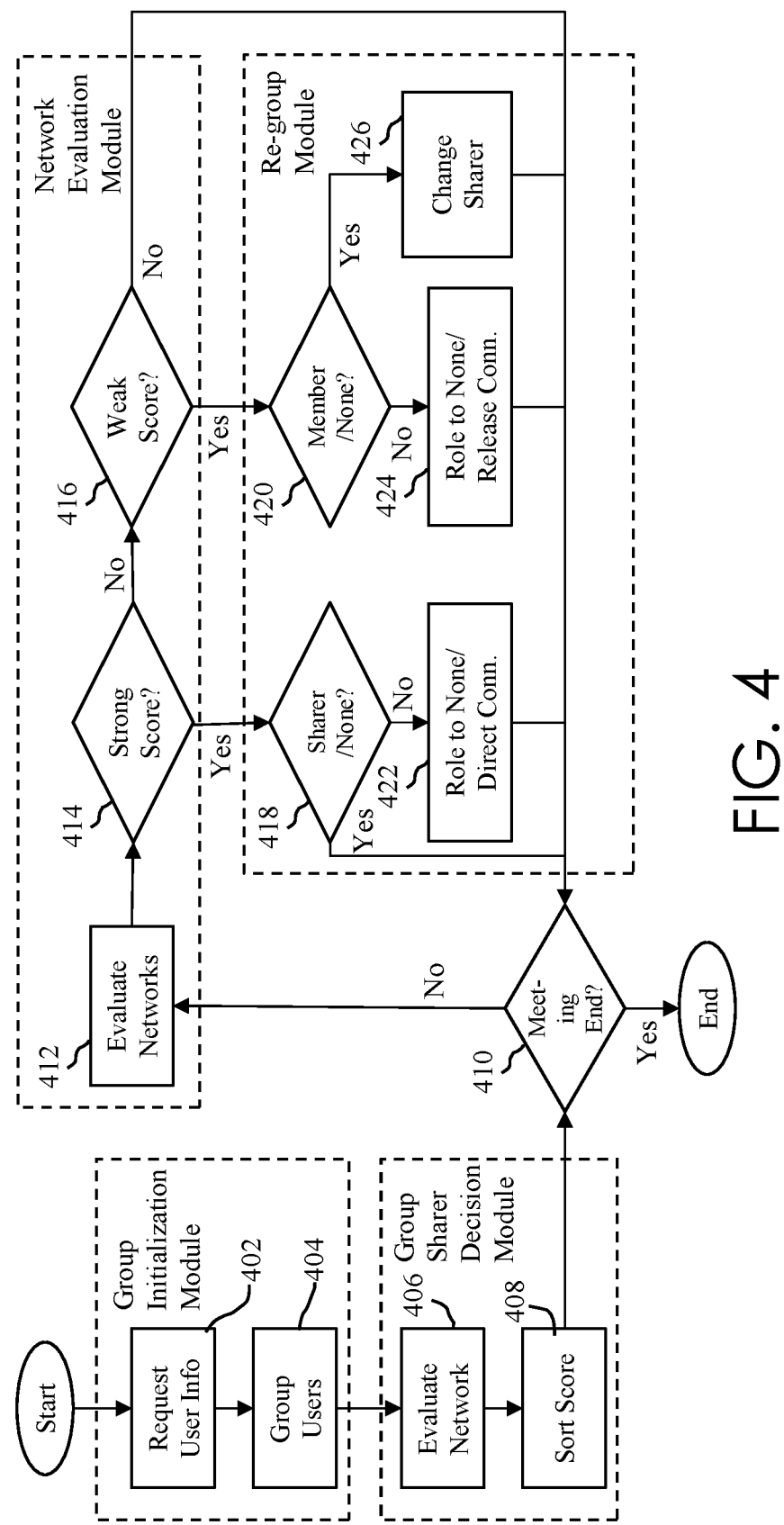
FIG. 4 is a flow diagram illustrating a method in an embodiment, which can reduce a network latency impact in an embodiment.

FIG. 4 is a flow diagram illustrating a method in an embodiment, which can reduce a network latency impact in an embodiment. The method can be performed by one or more computer processors. While the operations of the method are shown as modularized according to different modules, it should be understood that in one or more embodiments, any one or more modules or processors can perform the operations. At 402, a processor requests information about a user's device. For example, an online meeting user's device information such as the location and/or Internet Protocol (IP) address is requested. Information can be requested and gathered, e.g., from all users joining an online meeting and opted-in (given permission) to provide information and participate in the network latency reduction processing. At 404, a processor groups the users (user devices) according to the information, e.g., locations and IP addresses. For instance, those users (user devices) located in the same location and/or having the same IP addresses can be grouped together. In an embodiment, group initialization module (e.g., FIG. 2 at 202) implemented by a processor may perform the acts shown at 402 and 404.

At 406, a processor computes and evaluates network score between each of the users (e.g., user devices) and a server from where the online meeting data is to be streamed. At 408, a processor may sort the scores, for example, in descending order and mark the top threshold number of participants, e.g., 10 percent (%) of the participants, as sharers. A sharer refers to a user or user device, that acts as a source stream device for other users or user devices participating in an online meeting. These marked sharers (e.g., top 10 percent or another top number of participants) can be asked whether they would act as a sharer between the server and another one or more participants' devices. Based on the permission granted, some participants may indirectly stream data via a sharer (e.g., instead of directly streaming from the server). In an embodiment, group sharer decision module (e.g., FIG. 2 at 206) implemented by a processor may perform the acts shown at 406 and 408.

The following operations may take place continuously, for example, as a background process while the online meeting is in session. For instance, while the online meeting is on-going (as determined at 410), a processor can invoke functions or operations of the network evaluation module (e.g., FIG. 2 at 204) and re-group module (e.g., FIG. 2 at 208). For example, network evaluation module (e.g., FIG. 2 at 204) and re-group module (e.g., FIG. 2 at 208) can interact and cooperate in adjusting participant roles such that the network latency impact can be reduced. At 412, a processor may evaluate a network score between a user (e.g., user's device) and the server that is the original streaming source. A processor may also evaluate a network score between a user (e.g., user's device) and a sharer, e.g., for the user (e.g., user's device) whose streaming source has been routed via the sharer. This can be performed for all users joining the online meeting, e.g., and have opted-in (given permission) to provide information and participate in the network latency reduction processing.

At 414, it is determined whether the score between the user's device and the server is maintained at a threshold level designated as "good" or "strong". For the user or user's device that is streaming via a sharer, it is also determined whether the score between the user's device and the sharer's device is maintained at a threshold level designated as "good" or "strong" (also referred to as a first threshold). Such threshold can be configurable, and sets a criterion level for determining whether the network latency (e.g., the time it takes for a data packet to travel from one device to another) is "good". If the network score (between the user device and the server, and between the user device and the sharer device, if connecting to the sharer device) is determined to be "good", e.g., above a first threshold level (e.g., which can be configurable), the processing can proceed to 418. If not, e.g., the network score is below that threshold level, the processing can proceed to 416.

At 418, if the user's or user device's role is "sharer" (the user device is acting as a streaming source to another device (e.g., another user's device)), or "none" (the user device is streaming directly from the server), no action is taken, and the evaluating of the network score while the online meeting is taking place, can be performed, e.g., as shown at 410 and 412 flow. If the user device's role is not "sharer" and not "none", which indicates that the user device's role is "member", that is, the user device is streaming via another user device, at 422, the user device's role can be adjusted or changed to "none", and the user device can be directed or caused to connect to the server directly, to stream directly from the server, rather than routing through another user device. In this way, for example, since at 414, the score between the user device and the server is determined to be "good", this user device can directly connect to the server and directly stream from the server.

At 416, it is determined whether the network score between the user device and the server, and also between the user device and the sharer (e.g., if the user device is connecting to the sharer device), is weak. For example, if the network score is below a threshold level (also referred to as a second threshold level), which can be a criterion for determining whether the score is weak, the processing proceeds to 420. Otherwise (i.e., the network score is considered not to be weak), no action is taken, and the evaluating of the network score while the online meeting is taking place, can be performed, e.g., as shown at 410 and 412 flow.

At 420, if the user device's role is "member" or "none", that is, not "sharer", the processing proceeds to 426, otherwise, the processing proceeds to 424. At 424, i.e., if the user device's role is "sharer", the role is adjusted to "none", and the connection to other one or more devices that stream from this user device is released. That is, since the network score (e.g., network quality) is weak, the user device's connection with another "member" is released. At 426, which indicates that the user device streams directly from a server or indirectly via a sharer, network score is evaluated between the user device and the current sharers. One of the sharers is selected for connection, and the user device is caused to connect to the selected sharer for indirect streaming via that selected sharer device. In an embodiment, network evaluation module (e.g., FIG. 2 at 204), e.g., running on a processor, may perform the processing at 412, 414 and 416. In an embodiment, re-group module (e.g., FIG. 2 at 206), e.g., running on a processor, may perform the processing at 418, 420, 422, 424 and 426.

Figure 5:
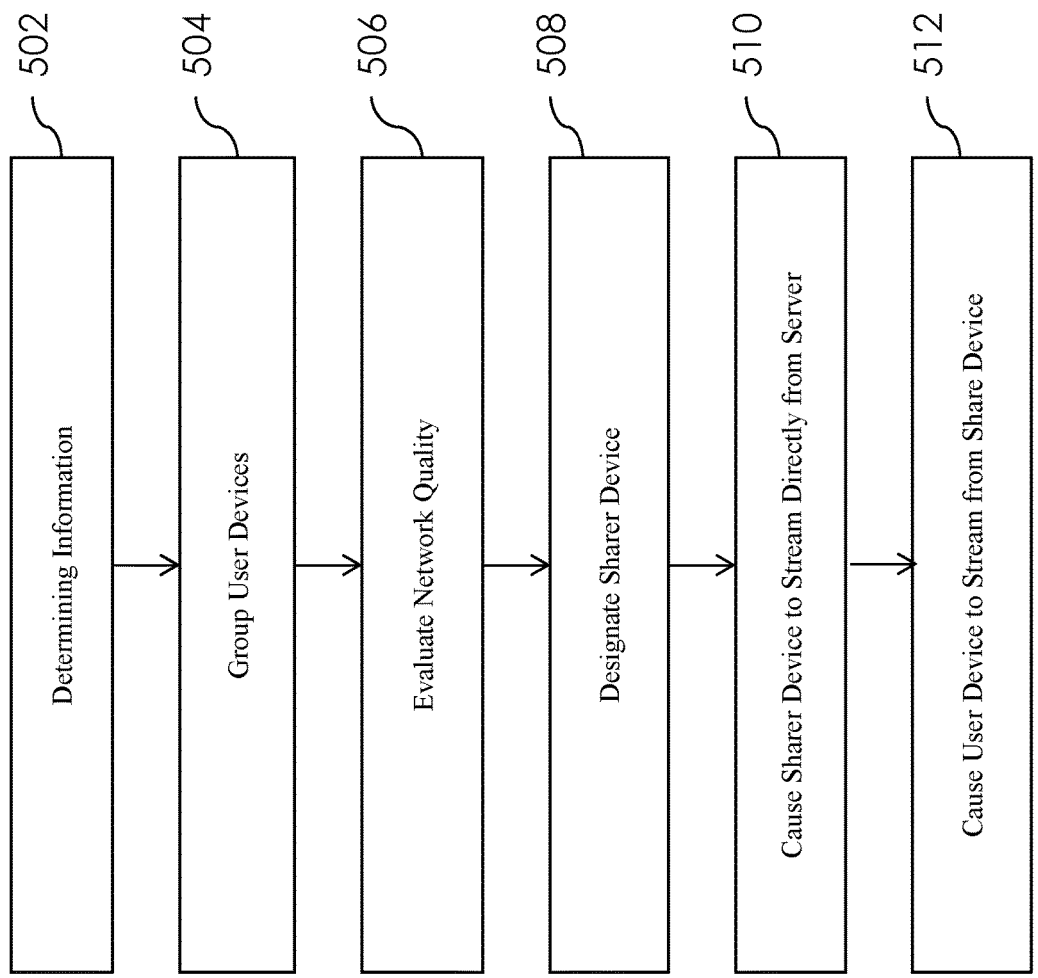
FIG. 5 is another flow diagram illustrating a method in an embodiment, which can reduce network latency impact during an online meeting.

FIG. 5 is another flow diagram illustrating a method in an embodiment, which can reduce network latency impact during an online meeting. The method can be implemented or run on one or more computer or hardware processors. For example, one or more processors can be configured to perform the method. At 502, a processor can determine information associated with a user device participating in an online meeting. This can be done for user devices connecting to the online meeting, e.g., all user (e.g., user devices) joining an online meeting and opted-in (given permission) to provide information and participate in the network latency reduction processing. For instance, users of the online meeting can be asked for permission for information and participation in the network latency reduction processing. For example, this can be done at the start of the online meeting, and/or during set of an online meeting tool, or another occasion. The information can include at least an Internet Protocol (IP) address of the user device. The information can also include a geographic location where a user device is located. Grouping by locations (e.g., within threshold perimeters of one another) can ensure that there are not long distances that data need to travel between devices, thus keeping the network latency low between user devices.

At 504, a processor can group the user devices based on the information. For example, user devices having similar IP addresses and/or located in a nearby areas as described above can be grouped together.

At 506, for each of the user devices in a group, a processor can evaluate network quality associated with network connection between a user device in the group and a server managing the online meeting. For example, network quality between a user device and the server, can be evaluated. This can be done for all user devices in the group.

At 508, based on the network quality associated with network connection between each of the user devices in a group and a server managing the online meeting, a processor can designate or select at least one user device in the group to operate as a sharer device to at least one other user device in the group. For example, in an embodiment, a processor can select n percentage of user devices in the group that have top network quality, that agree to share streams, where n can be configurable or given.

At 510, a processor can cause the sharer device to stream data directly from the server during the online meeting. For example, the processor can send instructions to the sharer device. The instructions can include from where to transfer or stream data during the online meeting, to which device to stream data.

At 512, a processor can cause at least one other user device that is to stream from the sharer device, to connect with and stream data from the sharer device during the online meeting.

The method in an embodiment can include repeatedly performing, for each of the user devices in the group, the evaluating of the network quality associated with network connection between a user device in the group and the server, and based on the evaluating adjusting direct and indirect streaming modes of the user devices in the group. Such dynamic adjustments can keep the network latency impact low or to a minimum, while the online meeting is taking place, and even as the network quality changes over time, for example, due to different loads or status in a system network.

In an embodiment, for at least one other user device that streams data from the sharer device, responsive to determining that the network quality between at least one other user device that streams data from the sharer device and the server, is above a first threshold, the method can include causing at least one other user device that streams data from the sharer device to stream directly from the server. For example, a processor can cause at least one other user device that streams data from the sharer device to stream directly from the server. In this way, for example, a user device that previously had a weak connection to the server and streamed from a sharer device, can now connect directly to the server and stream directly from the server, e.g., continuing to allow that user device to conduct the online meeting with low network latency impact.

In an embodiment, for at least one other user device that streams data from the sharer device, the method can include repeatedly evaluating sharer network quality associated with network connection between that one other user device and the sharer device, and responsive to determining that the sharer network quality is below a second threshold, and that the network quality between that one other user device and the server is below the second threshold, the method can further include selecting another sharer device in the group and causing that one other user device to connect with and stream data from another sharer device in the group. In this way, for example, if during the online meeting, the quality of the network connection between the sharer device and a user device that streams data from the sharer device (also referred to as "sharer network quality") becomes weak, the user device can switch to another sharer device in the group, such that that user device's network latency impact is kept low, even when its sharer device's connection becomes weak. Sharer network quality refers to the quality of the network connection between a user device that is operating or acting as a sharer device and another user device that streams data from that sharer device.

In an embodiment, for the sharer device, responsive to determining that the network quality between the sharer device and the server is below a second threshold, the method can include releasing the network connection between the sharer device and at least one other user device that streams data from the sharer device, and causing that one other user device to connect with and stream data from another sharer device in the group. In this way, for example, if during the online meeting, the sharer device's connection to the server becomes weak, a user device that connects indirectly via the sharer device can switch to another share device in the group, such that that user device's network latency impact is kept low, even when its sharer device's connection becomes weak.

In an embodiment, responsive to determining that the network quality between the sharer device and the server is below a second threshold, the method can also include adding a new sharer device to the group based on selecting a user device in the group having next top network quality. In this way, for example, the number of top sharer devices in the group can be maintained, in the event another sharer device should be selected, e.g., because of change in network quality associated with existing one or more sharer devices.

The method can also include, based on the evaluating of the network quality, generating a network score for each of the user devices in the group, and where the designating at least one user device in the group to operate as a sharer device can include, based on the network score for each of the user devices, designating at least one user device in the group to operate as a sharer device to at least one other user device in the group. In this way, network quality can be enumerated using a score, making it easier for a computer process to manipulate and operate with, for example, to normalize and manage.

In an embodiment, evaluating of the network quality can include performing at least one of: a speed test that measures download and upload speed of network connection; a ping test measures response time of network connection; a jitter test that measures variation in network packet delays; a packet loss test that measures relative amount of packets lost during transmission; and Mean Opinion Score (MOS) test that measures audio and video streaming qualities. In this way, different connection properties can be weighed in, when determining the network quality.

In an embodiment, evaluating of the network quality can include performing tests including at least a speed test that measures download and upload speed of network connection, a ping test measures response time of network connection, a jitter test that measures variation in network packet delays, a packet loss test that measures relative amount of packets lost during transmission, and Mean Opinion Score (MOS) test that measures audio and video streaming qualities, where the network quality is measured as a normalized weighted sum of measurements obtained from the tests. In this way, different weights can be attributed to different connection properties, when determining the network quality.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   determining information associated with a user device participating in an online meeting, for user devices connecting to the online meeting, the information including at least an Internet Protocol (IP) address of the user device;
   grouping the user devices based on the information;
   for each of the user devices in a group, evaluating network quality associated with network connection between a user device in the group and a server managing the online meeting, the server being a connectivity that provisions an online meeting and via which the user devices connect and communicate;
   based on the network quality, designating at least one user device in the group to operate as a sharer device to at least one other user device in the group;
   causing the sharer device to stream data directly from the server during the online meeting; and
   causing said at least one other user device to connect with the sharer device and stream data from the server indirectly via the sharer device during the online meeting.

2. The computer-implemented method of claim 1, wherein the information further includes location.

3. The computer-implemented method of claim 1, wherein the designating of said at least one user device in the group to operate as a sharer device includes, selecting n percentage of user devices in the group that have top network quality, that agree to share streams, wherein n is configurable.

4. The computer-implemented method of claim 1, further including repeatedly performing for each of the user devices in the group, the evaluating of the network quality associated with network connection between a user device in the group and the server managing the online meeting, and based on the evaluating adjusting direct and indirect streaming modes of the user devices in the group for streaming data from the server.

5. The computer-implemented method of claim 4, wherein for said at least one other user device that streams data from the sharer device, responsive to determining that the network quality between said at least one other user device that streams data from the sharer device and the server is above a first threshold, causing said at least one other user device that streams data from the sharer device to stream directly from the server.

6. The computer-implemented method of claim 4, wherein for said at least one other user device that streams data from the sharer device, repeatedly evaluating sharer network quality associated with network connection between said at least one other user device and the sharer device, and responsive to determining that the sharer network quality is below a second threshold, and that the network quality between said at least one other user device and the server is below the second threshold, selecting another sharer device in the group and causing said at least one other user device to connect with and stream data from said another sharer device in the group.

7. The computer-implemented method of claim 4, wherein for the sharer device, responsive to determining that the network quality between the sharer device and the server is below a second threshold, releasing network connection between the sharer device and said at least one other user device that streams data from the sharer device, and causing said at least one other user device to connect with and stream data from another sharer device in the group.

8. The computer-implemented method of claim 7, wherein responsive to determining that the network quality between the sharer device and the server is below a second threshold, the method further includes adding a new sharer device to the group based on selecting a user device in the group having next top network quality.

9. The computer-implemented method of claim 1, wherein the method further includes, based on the evaluating, generating a network score for each of the user devices in the group, and wherein the designating at least one user device in the group to operate as a sharer device includes, based on the network score for each of the user devices, designating at least one user device in the group to operate as a sharer device to at least one other user device in the group.

10. The computer-implemented method of claim 1, wherein the evaluating of the network quality includes performing at least one of: a speed test that measures download and upload speed of network connection; a ping test measures response time of network connection; a jitter test that measures variation in network packet delays; a packet loss test that measures relative amount of packets lost during transmission; and Mean Opinion Score (MOS) test that measures audio and video streaming qualities.

11. The computer-implemented method of claim 1, wherein the evaluating of the network quality includes performing tests including at least a speed test that measures download and upload speed of network connection, a ping test measures response time of network connection, a jitter test that measures variation in network packet delays, a packet loss test that measures relative amount of packets lost during transmission, and Mean Opinion Score (MOS) test that measures audio and video streaming qualities, wherein the network quality is measured as a normalized weighted sum of measurements obtained from the tests.

12. A computer program product comprising a computer readable storage medium having program instructions embodied therewith, the program instructions readable by a device to cause the device to:
   determine information associated with a user device participating in an online meeting, for user devices connecting to the online meeting, the information including at least an Internet Protocol (IP) address of the user device;
   group the user devices based on the information;
   for each of the user devices in a group, evaluate network quality associated with network connection between a user device in the group and a server managing the online meeting, the server being a connectivity that provisions an online meeting and via which the user devices connect and communicate;

based on the network quality, designate at least one user device in the group to operate as a sharer device to at least one other user device in the group;

cause the sharer device to stream data directly from the server during the online meeting; and cause said at least one other user device to connect with the sharer device and stream data from the server indirectly via the sharer device.

13. The computer program product of claim 12, wherein the information further includes location.

14. The computer program product of claim 12, wherein the device is caused to designate said at least one user device in the group to operate as a sharer device by at least selecting n percentage of user devices in the group that have top network quality, that agree to share streams, wherein n is configurable.

15. The computer program product of claim 12, wherein the device is further caused to repeatedly evaluate, for each of the user devices in a group, the network quality associated with network connection between a user device in the group and the server, and based on the evaluating adjust direct and indirect streaming modes of the user devices in the group for streaming data from the server.

16. The computer program product of claim 15, wherein for said at least one other user device that streams data from the sharer device, responsive to determining that the network quality between said at least one other user device that streams data from the sharer device and the server is above a first threshold, the device is caused to cause said at least one other user device that streams data from the sharer device to stream directly from the server.

17. The computer program product of claim 15, wherein for said at least one other user device that streams data from the sharer device, the device is caused to repeatedly evaluate sharer network quality associated with network connection between said at least one other user device and the sharer device, and responsive to determining that the sharer network quality is below a second threshold, and that the network quality between said at least one other user device and the server is below the second threshold, select another sharer device in the group and cause said at least one other user device to connect with and stream data from said another sharer device in the group.

18. The computer program product of claim 15, wherein for the sharer device, responsive to determining that the network quality between the sharer device and the server is below a second threshold, the device is caused to release network connection between the sharer device and said at least one other user device that streams data from the sharer device, and cause said at least one other user device to connect with and stream data from another sharer device in the group.

19. The computer program product of claim 18, wherein responsive to determining that the network quality between the sharer device and the server is below a second threshold, the device is further caused to add a new sharer device to the group based on selecting a user device in the group having next top network quality.

20. A system comprising:

at least one computer processor; and a memory device coupled with the computer processor;

the at least one computer processor configured to at least:

determine information associated with a user device participating in an online meeting, for user devices connecting to the online meeting, the information including at least an Internet Protocol (IP) address of the user device;

group the user devices based on the information;

for each of the user devices in a group, evaluate network quality associated with network connection between a user device in the group and a server managing the online meeting, the server being a connectivity that provisions an online meeting and via which the user devices connect and communicate;

based on the network quality, designate at least one user device in the group to operate as a sharer device to at least one other user device in the group;

cause the sharer device to stream data directly from the server during the online meeting; and cause said at least one other user device to connect with the sharer device and stream data from the server indirectly via the sharer device.

\* \* \* \* \*